(12) United States Patent
Wang

(10) Patent No.: US 10,250,515 B2
(45) Date of Patent: Apr. 2, 2019

(54) METHOD AND DEVICE FOR FORWARDING DATA MESSAGES

(71) Applicant: BEIJING BAIDU NETCOM SCIENCE AND TECHNOLOGY CO., LTD., Haidian District Beijing (CN)

(72) Inventor: Tianyu Wang, Haidian District Beijing (CN)

(73) Assignee: Beijing Baidu Netcom Science and Technology Co., LTD., Beijing (CN)

( * ) Notice: Subject to any disclaimer, the term of this patent is extended or adjusted under 35 U.S.C. 154(b) by 250 days.

(21) Appl. No.: 15/281,328

(22) Filed: Sep. 30, 2016

(65) Prior Publication Data

US 2017/0346753 A1    Nov. 30, 2017

(30) Foreign Application Priority Data

May 25, 2016    (CN) .......................... 2016 1 0355130

(51) Int. Cl.
*H04L 12/805* (2013.01)
*H04L 29/06* (2006.01)
(Continued)

(52) U.S. Cl.
CPC .......... *H04L 47/36* (2013.01); *H04L 29/0653* (2013.01); *H04L 43/16* (2013.01);
(Continued)

(58) Field of Classification Search
CPC ....... H04L 2012/5652; H04L 29/06102; H04L 29/0653; H04L 29/0863; H04L 49/9042; H04L 69/22; H04L 67/147; H04L 69/161
See application file for complete search history.

(56) References Cited

U.S. PATENT DOCUMENTS

| 8,856,203 B1 * | 10/2014 | Schelp | G06F 12/02 370/389 |
| 2007/0165537 A1 * | 7/2007 | Magnusson | H04W 48/18 370/254 |

(Continued)

*Primary Examiner* — Ashley Shivers
(74) *Attorney, Agent, or Firm* — Miller, Matthias & Hull LLP

(57) ABSTRACT

The present application discloses a method and device for forwarding a data message. A specific embodiment of the method comprises: receiving the data message and reading a data context length value of a first row in the data message; determining whether the data context length value is less than or equal to a maximum segment size in a single transmission according to a transmission control protocol; reading data from the data message in segments in response to the data context length value being less than or equal to the maximum segment size in the single transmission according to the transmission control protocol; reading data from the data message in rows in response to the data context length value being greater than the maximum segment size in the single transmission according to the transmission control protocol; and storing the read data in a user buffer, and sending the data in the user buffer to a terminal if the data in the user buffer exceeds a preset capacity threshold. According to this embodiment, the data messages can be quickly and efficiently forwarded.

13 Claims, 6 Drawing Sheets

(51) Int. Cl.
*H04L 12/861* (2013.01)
*H04L 12/26* (2006.01)
*H04L 12/801* (2013.01)

(52) U.S. Cl.
CPC ........ *H04L 47/193* (2013.01); *H04L 49/9005* (2013.01); *H04L 49/9042* (2013.01); *H04L 49/9094* (2013.01); *H04L 69/22* (2013.01)

(56) References Cited

U.S. PATENT DOCUMENTS

2011/0307577 A1* 12/2011 McDaniel ............... H04L 29/06
709/217
2012/0163394 A1* 6/2012 Chen ................... H04L 49/9042
370/401
2017/0353587 A1* 12/2017 Teshigawara ........... H04L 69/22

* cited by examiner

METHOD AND DEVICE FOR FORWARDING DATA MESSAGES

CROSS-REFERENCE TO RELATED APPLICATION

This application is related to and claims priority from Chinese Application No. 201610355130.6, filed on May 25, 2016, entitled "METHOD AND DEVICE FOR FORWARDING DATA MESSAGES," the entire disclosure of which is hereby incorporated by reference.

TECHNICAL FIELD

The present application relates to the field of computer technology, specifically to the field of Internet technology, and more specifically to a method and device for forwarding a data message.

BACKGROUND

A data message is a data unit used for Internet exchange and transmission according to defined technical standards or protocols. The data message contains complete data information to be sent and has various unconstrained and variable lengths. Efficient forwarding of the data messages leads to improvement in data transmission speed and prudent resource utilization.

However, using existing data message forwarding approach, the data message is typically forwarded after the data message is fully read, such that a terminal's idle period is long. In addition, when the data message is read, the length of data transmitted in a single transmission cannot be optimally distributed according to the length defined by the transmission control protocol, resulting in problems of resource waste and slow reading speed.

SUMMARY

An object of the present application is to provide an improved method and device for forwarding a data message, in order to solve the technical problem mentioned in the foregoing Background section.

In a first aspect, the present application provides a method for forwarding a data message, comprising: receiving the data message and reading a data context length value of a first row in the data message; determining whether the data context length value is less than or equal to a maximum segment size in a single transmission according to a transmission control protocol; reading data from the data message in segments in response to the data context length value being less than or equal to the maximum segment size in the single transmission according to the transmission control protocol; reading data from the data message in rows in response to the data context length value being greater than the maximum segment size in the single transmission according to the transmission control protocol; and storing the read data in a user buffer, and sending the data in the user buffer to a terminal if the data in the user buffer exceeds a preset capacity threshold.

In some embodiments, the reading data from the data message in segments in response to the data context length value being less than or equal to the maximum segment size in the single transmission according to the transmission control protocol comprises: packaging the data message into at least one data segment according to the maximum segment size; copying each of the at least one data segment to a user space by data coping; and unpackaging the at least one data segment after the at least one data segment is completely copied to the user space.

In some embodiments, the unpackaging the at least one data segment after the at least one data segment is completely copied to the user space comprises: determining successively a data length of each row in each data segment from the at least one data segment copied to the user space in chronological order according to copy time, the data length of each row being a sum of a fixed data length used to store the data context length value of each row and a data context length of each row; and determining data context of each row according to the data length of each row.

In some embodiments, the determining successively a data length of each row in each data segment from the at least one data segment copied to the user space in chronological order according to copy time comprises: reading the fixed data length; determining the data context length value of each row by reading the fixed data length; and determining the data context length of each row according to the data context length value of each row.

In some embodiments, the copying each of the at least one data segment to a user space by data coping comprises: copying the data segment from a protocol engine to a socket buffer in a kernel space via direct memory access; and copying the data segment copied to the socket buffer to the user buffer in the user space.

In some embodiments, the reading data from the data message in rows in response to the data context length value being greater than the maximum segment size in a single transmission according to the transmission control protocol comprises: reading data of each row in the data message successively according to descending row numbers and storing the data in the user buffer in the user space; and determining data context of each row according to the read data length of each row.

In some embodiments, the storing the read data in a user buffer, and sending the data in the user buffer to a terminal if the data in the user buffer exceeds a preset capacity threshold comprises: accumulating a data length value of the read data message until the preset capacity threshold of the user buffer is reached; sending the data of each row read to the terminal when the preset capacity threshold is reached, and resetting the user buffer; and continuing reading unread data in the data message and storing the read data in the reset user buffer.

In a second aspect, the present application provides a device for forwarding a data message, comprising: a receiving unit configured to receive the data message and read a data context length value of a first row in the data message; a determination unit configured to determine whether the data context length value is less than or equal to a maximum segment size in a single transmission according to a transmission control protocol; a segment reading unit configured to read data from the data message in segments in response to the data context length value being less than or equal to the maximum segment size in the single transmission according to the transmission control protocol; a row reading unit configured to read data from the data message in rows in response to the data context length value being greater than the maximum segment size in the single transmission according to the transmission control protocol; and a sending unit configured to store the read data in a user buffer and send the data in the user buffer to a terminal if the data in the user buffer exceeds a preset capacity threshold.

In some embodiments, the segment reading unit comprises: a packaging subunit configured to package the data message into at least one data segment according to the maximum segment size; a copying subunit configured to copy each of the at least one data segment to a user space by data coping; and an unpackaging subunit configured to unpackage the at least one data segment after the at least one data segment is completely copied to the user space.

In some embodiments, the unpackaging subunit comprises: a data length determination module configured to determine successively a data length of each row in each data segment from the at least one data segment copied to the user space in chronological order according to copy time, the data length of each row being a sum of a fixed data length used to store the data context length value of each row and a data context length of each row; and a data context determination module configured to determine data context of each row according to the data length of each row.

In some embodiments, the data length determination module is further configured to: read the fixed data length; read the data context length value of each row by reading the fixed data length; and determine the data context length of each row according to the data context length value of each row.

In some embodiments, the copying subunit is further configured to copy the data segment from a protocol engine to a socket buffer in a kernel space via direct memory access; and copy the data segment copied to the socket buffer to the user buffer in the user space.

In some embodiments, the row reading unit is further configured to: read data of each row in the data message successively according to descending row numbers and storing the data in the user buffer in the user space; and determine data context of each row according to the read data length of each row.

In some embodiments, the sending unit comprises: an accumulation subunit configured to accumulate a data length value of the read data message until the preset capacity threshold of the user buffer is reached; a sending subunit configured to send the data of each row read to the terminal when the preset capacity threshold is reached, and resetting the user buffer; and a reading subunit configured to continue reading unread data in the data message and storing the read data in the reset user buffer.

In the method and device for forwarding a data message provided in the present application, a data context length value of a first row in the data message is read and compared with the maximum segment size in a single transmission according to the transmission control protocol. When the data context length value of the first row in the data message is less than or equal to the maximum segment size in the single transmission according to the transmission control protocol, the data in the data message are read in segments. When the data context length value of the first row in the data message is greater than the maximum segment size in the single transmission according to the transmission control protocol, the data in the data message are read in rows. Finally, the read message is stored in a user buffer, and the data in the user buffer are sent to a terminal if the data in the user buffer exceeds a present threshold. In this way, the resources of transmission control protocol can be effectively utilized, the terminal's idle time can be reduced and the data messages can be efficiently forwarded.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF PREFERRED EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
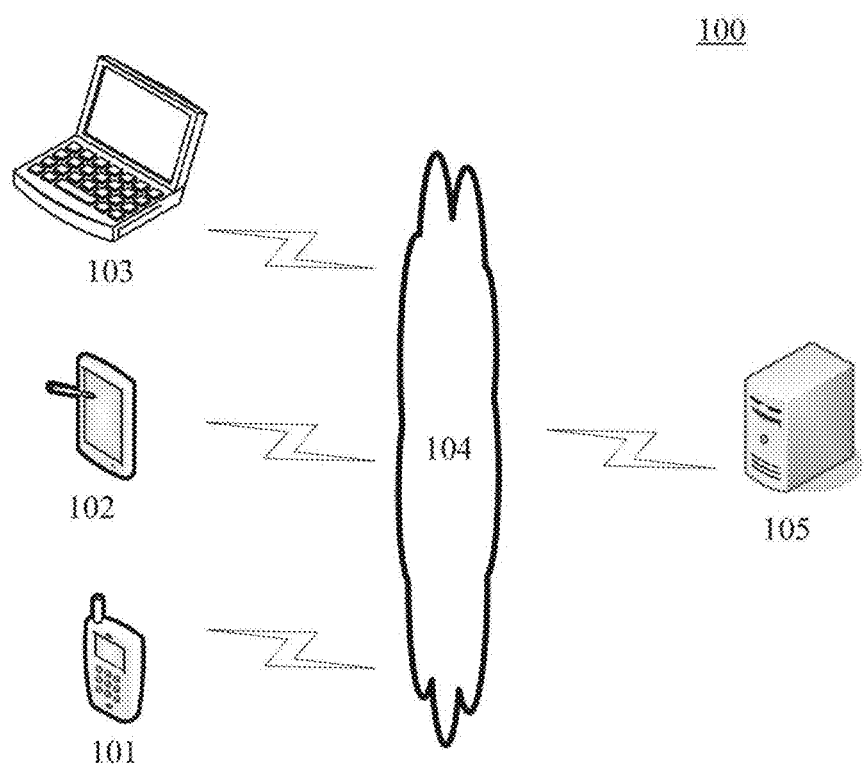
FIG. 1 is an architectural diagram of an exemplary system in which the present application may be implemented.

FIG. 1 shows an exemplary architecture of a system 100 in which a method for forwarding a data message or a device for forwarding a data message according to an embodiment of the present application may be implemented.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The server 105 may interact with the terminal devices 101, 102 and 103 through the network 104, in order to send data messages to the terminal devices 101, 102 and 103, etc. Various applications capable of receiving and reading data messages, such as web browser applications, search applications, instant messaging tools, mailbox clients, social platform software, etc. may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server apable of reading and forwarding various data messages, for example, a background server reading and sending data messages required by the terminal devices 101, 102 or 103. The background server may acquire and process the data messages required by the terminal devices, and then forwarding the data messages to the terminal devices.

It should be noted that the method for forwarding a data message according to the embodiments of the present application is generally executed by the server 105, and accordingly, the device for forwarding a data message is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
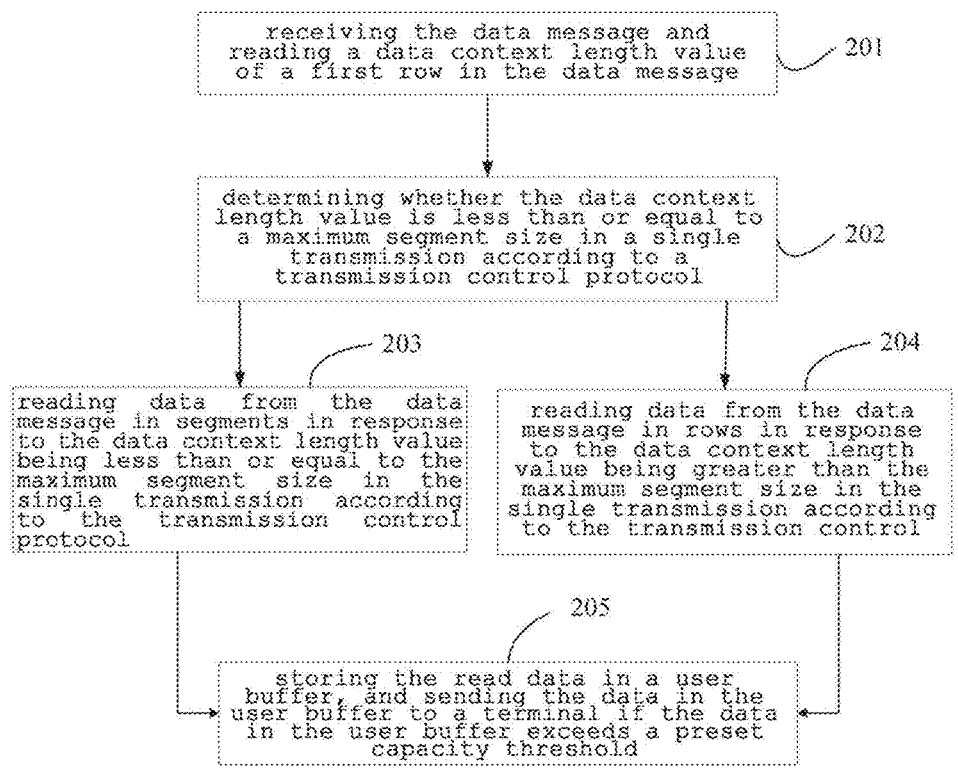
FIG. 2 is a flowchart of a method for forwarding a data message according to an embodiment of the present application.

Further referring to FIG. 2, which illustrates a flow 200 of a method for forwarding a data message according to an embodiment of the present application. The method for forwarding a data message comprises the following steps:

Step 201, receiving the data message and reading a data context length value of a first row in the data message.

In this embodiment, an electronic device (such as a server shown in FIG. 1) on which the method for forwarding a data message is implemented, can receive a data message from a database in which data messages to be acquired are stored via a wired connection or a wireless connection. The electronic device can read the data context length value of the first row in the data message while the data message to be acquired is received. These databases include, but are not limited to, MYSQL database, ORACLE database, and DB2 database. It should be noted that the wireless connection may include, but is not limited to 3G/4G connection, WiFi connection, Bluetooth connection, WiMAX connection, Zigbee connection, UWB (ultra wideband) connection, and other known or wireless connections to be developed in the future.

Typically, data in each row in a data message consist of a data context length and data context. For example, in the MYSQL database, each row in the data message is in the form of data-length (data context length)+data-context (data context), where the data context length value is stored in the data-length, and the length value of the data-length is a fixed value. When MYSQL database messages are received, the length value of the data-length of the first row is read first, thereby to determine the data context length value. The data context is determined by reading the data context length value.

Step 202, determining whether the data context length value is less than or equal to a maximum segment size in a single transmission according to a transmission control protocol.

In this embodiment, based on the data context length value of the first row obtained in Step 201, the electronic device (such as a server shown in FIG. 1) can compare the data context length value of first row with the maximum segment size value in a single transmission according to a transmission control protocol, and determine whether the data context length value is less than or equal to the maximum segment size value in a single transmission according to the transmission control protocol. The transmission control protocol (TCP) is a transport layer communication protocol for data transmission based on byte stream. The maximum segment size (MSS) is an option defined in the transmission control protocol, which is used, when the transmission control protocol connection is built, for both the sender and receiver to negotiate the maximum data length that each message segment can carry in communication.

Step 203, reading data from the data message in segments in response to the data context length value being less than or equal to the maximum segment size in the single transmission according to the transmission control protocol.

In this embodiment, based on the determination for the comparison between the above data context length value and the maximum segment size in a single transmission according to the transmission control protocol made in step 202, when the above data context length value is less than or equal to the maximum segment size in a single transmission according to the transmission control protocol, it indicates that the transmission control protocol still has idle resources and can carry more data for transmission when the above-mentioned first row of data are completely transmitted by the transmission control protocol. At this moment, the data message to be read is divided into a plurality of segments, and one segment is read at a time.

In some alternative implementations of this embodiment, reading the data from the data message in segments may be that, based on the maximum segment size, the data message are divided into at least one data segment of the same length as the maximum segment size, and the data segment is packaged; and all the above data segments are copied to the user space after the packaging of the data segments is completed. An individual storage space is preset within the user space to store the copied data segments. The user space is a space in which a normal application program of the Linux system runs. In the space, the processor controls the direct access to hardware and the unauthorized access to memory of the application program. After the data segments are completely copied to the user space, the data segments are unpackaged.

In some alternative implementations of this embodiment, the unpackaging the data segments may be, reading successively a data length of each row in each data segment from each data segment copied to the user space in chronological order according to copy time. The data length of each row includes at least two parts, one is of a fixed length value and for storing the data context length value of each row, and the other is of a variable length and for storing the data context. When the data length of each row is read, the fixed data length used to store the data context length value of each row can be read first. The data context length value of each row can be determined by reading the fixed data length. The data context length of each row can be determined by acquiring the data context length value of each row. Also, the data context of the row can be determined by reading data in this data context length.

In some alternative implementations of this embodiment, the server can copy each data segment of the above at least one data segment from the protocol engine to the socket buffer of the kernel space via direct memory access. The protocol engine is an engine provided in the direct memory access space of a system and used to characterize the transmission control protocol, and the socket is a combination of a source address and a destination IP address as well as a source port number and a destination port number. The socket buffer is provided in the kernel space. The kernel space is a space in which some core software in the Linux system ran, and the software in the space has an access to hardware devices. Under the control of the Central Processing Unit (CPU), the server can copy the data segments which are copied to the socket buffer of the kernel space to the user space. Thus, on the user-space level, the server copies the data to the user buffer of the user space by unpackaging. The user buffer is used to buffer the data message to be forwarded.

Step 204, reading data from the data message in rows in response to the data context length value being greater than the maximum segment size in the single transmission according to the transmission control protocol.

In this embodiment, based on the determination for the comparison between the above length value and the maximum segment size in the single transmission according to the transmission control protocol made in step 202, when the above length value is greater than the maximum segment size in a single transmission according to the transmission control protocol, the data in one row cannot be transmitted completely at a time according to the transmission control protocol, and need to be transmitted more than once. Therefore, the server reads the data in the data message in rows.

In some alternative implementations of this embodiment, reading the data in the data message in rows by the server may be that the data-length of each row in the data message can be read successively from front to back. The fixed data length (for storing the data context length value of each row) of the first row can be read first. The data context length value of the first row can be acquired by reading the fixed data length, and the data context length of the first row can be determined through the data context length value of the first row. Since the data context length value of the first row is greater than the maximum segment size in a single transmission according to the transmission control protocol, the data context length of the first row may be read in multiple times. After the data length of the first row is read, it continues reading the data length of the next row until the data of the data message are completely read. The read data are stored in the storage space of the user space, and are then copied from the storage space to the user buffer. In the process of reading the data, the data context of each row is determined by determining the read data length of each row.

Step 205, storing the read data in the user buffer, and sending the data in the user buffer to the terminal if it exceeds a preset capacity threshold.

In this embodiment, the server stores the data read in segments in step 203 or the data read in rows in step 204 in the user buffer. A certain capacity threshold is set for the user buffer, and the server sends the data buffered in the user buffer to a terminal device when the data length read by the server is greater than the capacity threshold.

Figure 3A:
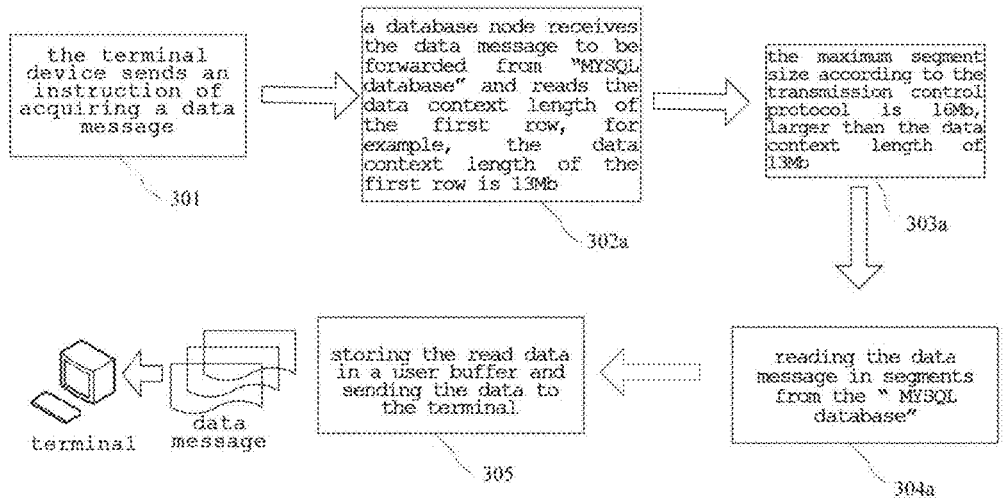
FIGS. 3a and 3b are illustrations of application scenarios of the method for forwarding a data message according to the present application.
Figure 3B:
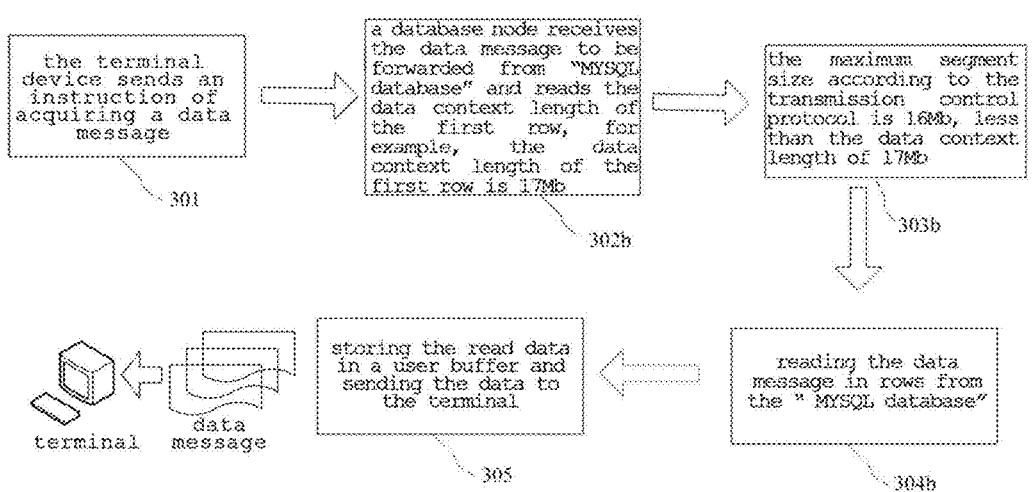

Further referring to FIGS. 3a and 3b, FIGS. 3a and 3b are illustrations of application scenarios of the method for forwarding a data message according to this embodiment. After the terminal device sends an instruction of acquiring a data message, a database node first receives the data message to be forwarded from the MYSQL database and reads the data context length of the first row. In the MYSQL database, the maximum segment size according to the transmission control protocol is 16 Mb. In the application scenario shown in FIG. 3a, when the data context length of the first row is 13 Mb, since 13 Mb is less than 16 Mb, the data message is read in segments. In the application scenario shown in FIG. 3b, when the data context length of the first row is 17 Mb, since 17 Mb is greater than 16 Mb, the data message is read in rows. The data read in FIG. 3a or 3b are stored in the user buffer in the user space. The threshold for the user buffer is set to be 8 Mb. When the read data stored in the user buffer reach 8 Mb, the 8 Mb data which reach the threshold are sent to the terminal.

The method provided in the above embodiments of the present application prudently utilizes resources of the transmission control protocol by dividing package reading into reading in segments and reading in rows. In addition, by setting a data threshold for the user buffer, data messages can be forwarded quickly to reduce the waiting time of the terminal.

Figure 4:
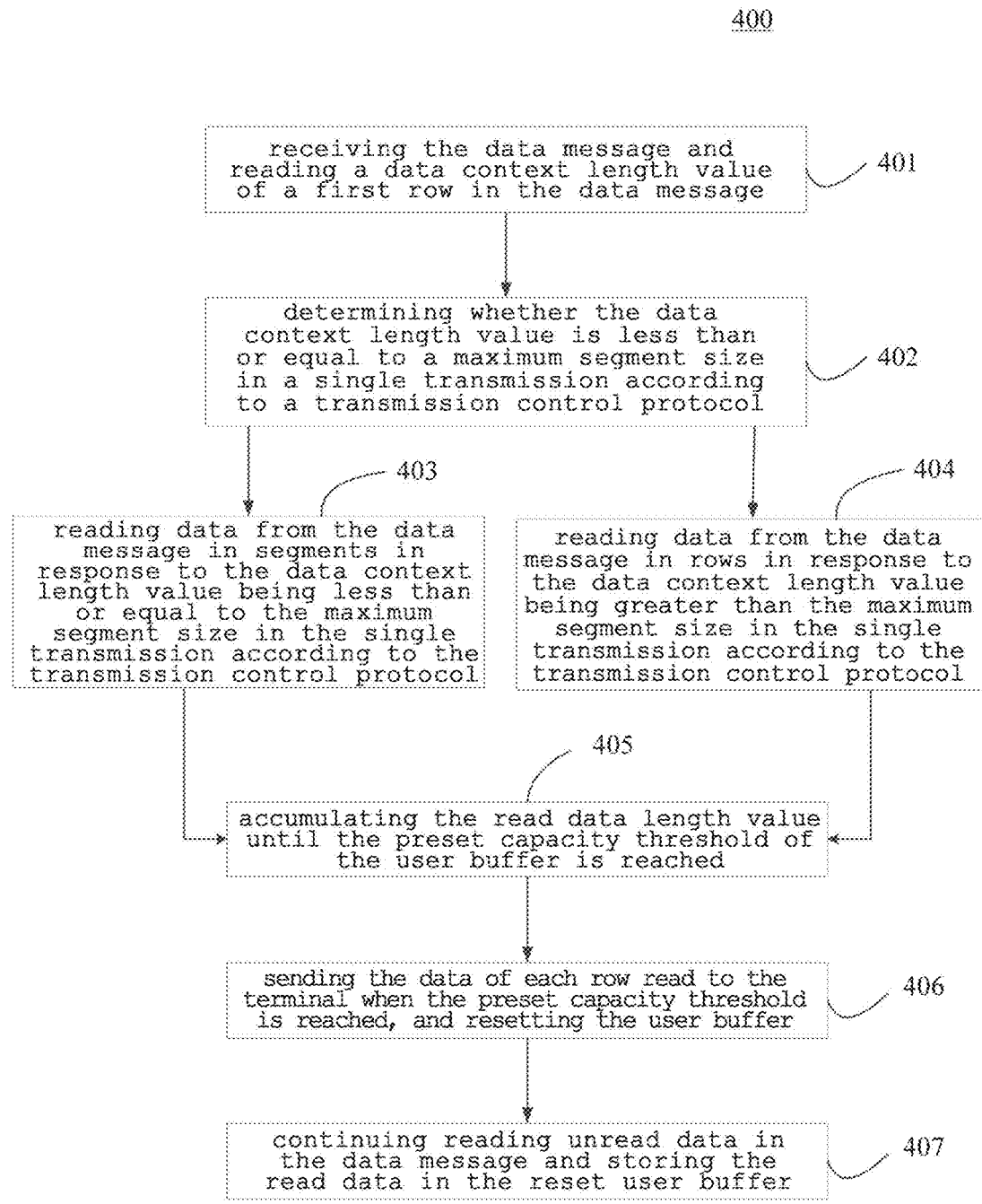
FIG. 4 is a flowchart of a method for forwarding a data message according to another embodiment of the present application.

Further referring to FIG. 4, which illustrates a flow 400 of a method for forwarding a data message according to another embodiment of the present application. The flow 400 of the method for forwarding a data message comprises the following steps:

Step 401, receiving a data message and reading a data context length value of the first row in the data message.

In this embodiment, an electronic device (such as a server shown in FIG. 1) on which the method for forwarding a data message is implemented, can receive a data message from a database in which data messages to be acquired are stored via a wired connection or a wireless connection. The electronic device can read the data context length value of the first row in the data message while the data message to be acquired is received.

Step 402, determining whether the data context length value of the first row is less than or equal to the maximum segment size in a single transmission according to the transmission control protocol.

In this embodiment, the specific process in Step 402 can be referred to Step 202 according to the embodiment shown in FIG. 2. Here, detailed description thereof will be omitted.

Step 403, reading data from the data message in segments in response to the data context length value of the first row being less than or equal to the maximum segment size in the single transmission according to the transmission control protocol.

In this embodiment, the specific process in Step 403 can be referred to Step 203 according to the embodiment shown in FIG. 2. Here, detailed description thereof will be omitted.

Step 404, reading data from the data message in rows in response to the data context length value of the first row being greater than the maximum segment size in the single transmission according to the transmission control protocol.

Based on the determination for the comparison between the above data context length value and the maximum segment size in the single transmission according to the transmission control protocol made in step 402, when the above data context length value is greater than the maximum segment size in a single transmission according to the transmission control protocol, the data in the data message is read in rows. During the reading, the server may read data of the first row in the data message in multiple times and directly store the read data in chronological order according to row numbers read in the user buffer. During the storing in the user buffer, the data are stored in units of rows.

Step 405, accumulating the read data length value until the preset capacity threshold of the user buffer is reached.

In this embodiment, when the data are read in segments, the server divides the data segments stored in the user space. After the original data message is obtained, each of the data segments copied to the user space is successively stored in the user buffer in chronological order according to copy time, and the data length stored in the user buffer is accumulated until it reaches the preset capacity threshold of the user buffer. As an example, the whole data message is divided into two data segments, each including three rows of data. The server first reads the data segment copied to the user space in units of rows and store it in the user buffer. Assuming that the user buffer has a preset threshold of 9 Mb, the data length value of the read three rows is 6 Mb, and then there is still a storage space in the user buffer. The server may read a data segment later copied to the user space, in which the data length value of the minimal row is 2 Mb. The data having a length of 2 Mb is stored in the user buffer. At this moment, the data stored in the user buffer are of 8 Mb. Since there are no data having a length less than or equal to 1 Mb in units of rows, the 8 Mb reaches the preset capacity threshold. The remaining data that have not been stored in the user buffer are in a waiting state.

In this embodiment, when the data are read in rows, starting from the first row, the server stores the read data in the user buffer successively according to ascending row numbers and stops reading the data until the data buffer reaches the preset capacity threshold.

Step 406, sending the data of each row read to the terminal when the preset capacity threshold is reached, and resetting the user buffer.

In this embodiment, after issuing an instruction of obtaining a data message, the terminal device has been in an idle state until it receives the data message, and then processes the data. Furthermore, when the terminal device receives the data, it can only receive and process the data in units of rows. Based on the data stored in the user buffer in step 405, the server sends the above data to a terminal device in units of rows, and then resets the user buffer, such that the user buffer can continue storing data.

Step 407, continuing reading unread data in the data message and storing the read data in the reset user buffer.

Based on resetting the user buffer in step 406, for the data read in segments, the data in the waiting state in step 405 are stored in the user buffer. The stored data in the user buffer are then sent to the terminal device. For the data read in rows, the unread data are continued to be read and the read data are then stored in the data buffer. When the data buffer reaches the present threshold, the data are sent to the terminal device. In this way, the data in the data message are completely read.

As can be seen from FIG. 4, compared with the embodiment corresponding to FIG. 2, the flow 400 of the method for forwarding a data message according to this embodiment highlights the steps of accumulating data in the user buffer and resetting the user buffer after the data are sent. Accordingly, the solution described in the present embodiment may read and send the data message more quickly and effectively.

Figure 5:
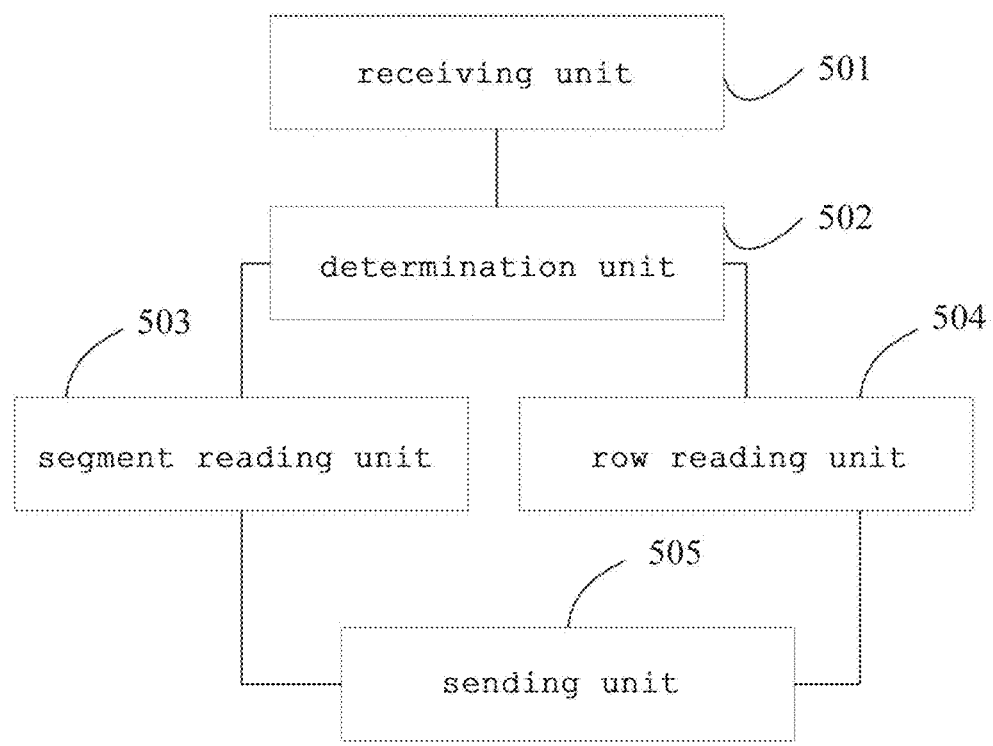
FIG. 5 illustrates a structural schematic diagram of a device for forwarding a data message according to an embodiment of the present application.

Further referring to FIG. 5, as the implementation of methods shown in the above figures, the present application provides a device for forwarding a data message according to an embodiment, which corresponds to the method embodiment shown in FIG. 2. Specifically, the device can be applied to various electronic equipments.

As shown in FIG. 5, the device 500 for forwarding a data message according to the present embodiment comprises: receiving unit 501, determination unit 502, segment reading unit 503, row reading unit and sending unit 505. The receiving unit 501 is configured to receive the data message and read a data context length value of a first row in the data message; the determination unit 502 is configured to determine whether the data context length value is less than or equal to a maximum segment size in a single transmission according to a transmission control protocol; the segment reading unit 503 is configured to read data from the data message in segments in response to the data context length value being less than or equal to the maximum segment size in the single transmission according to the transmission control protocol; the row reading unit 504 is configured to read data from the data message in rows in response to the data context length value being greater than the maximum segment size in the single transmission according to the transmission control protocol; and the sending unit 505 is configured to store the read data in a user buffer and send the data in the user buffer to a terminal if the data in the user buffer exceeds a preset capacity threshold.

In this embodiment, the receiving unit 501 of the device 500 for forwarding a data message can receive a data message from a database in which data messages to be acquired are stored via a wired connection or a wireless connection, and read the data context length value of the first row in the data message while the data message to be acquired is received.

In this embodiment, on the basis of the data context length value of the first row obtained by the receiving unit 501, the determination unit 502 can compare the data context length of the first row with the maximum segment size in a single transmission according to the transmission control protocol, and determine whether the data context length is less than the maximum segment size in a single transmission according to the transmission control protocol.

In this embodiment, after the determination unit 502 determines the comparison between the data context length of the first row and the maximum segment size in a single transmission according to the transmission control protocol, the segment reading unit 503 may respond to the data context length being less than or equal to the maximum segment size in a single transmission according to the transmission control protocol. At that time, the data message to be read is divided into a plurality of segments, and one segment is read at a time.

In this embodiment, after the determination unit 502 determines the comparison between the data context length of the first row and the maximum segment size in a single transmission according to the transmission control protocol, the row reading unit 504 may respond to the data context length being greater than the maximum segment size in a single transmission according to the transmission control protocol. At that time, the data message to be read is read in rows. When one row of data are not completely read once, it may be read in multiple times.

In this embodiment, the data read by the segment reading unit 503 in segments or the data read by the row reading unit 504 in rows are stored in the user buffer of the sending unit 505. A certain capacity threshold is set for the user buffer, and the data buffered in the user buffer are sent to a terminal device when the read data length is greater than the capacity threshold.

In some alternative implementations of this embodiment, the segment reading unit 503 of the device 500 for forwarding a data message further comprises an packaging subunit (not shown) configured to according to the maximum segment size, divide the data message into at least one data segment of the same length as the maximum segment size, and to package the data segment; a copying subunit (not shown) configured to copy all the data segments to the user space after the data segments is completely packaged; an unpackaging subunit (not shown) configured to unpackage the data segments after the data segments are completely copied to the user space. The unpackaging subunit further comprises a data length determination module (not shown) configured to, after the data segments are completely copied to the user space, determine successively a data length of each row in each data segment in chronological order according to copy time, the data length of each row being a sum of a fixed data length used to store the data context length value of each row and a data context length of each row; a data context determination module (not shown) configured to determine data context of each row according to the value of data length of each row determined by the data length determination module (not shown). The data length determination module (not shown) is further configured to determine the fixed data length first, to determine the data context length value through the fixed data length, and to determine the data context length according to the data context length value. The copying subunit (not shown) is further configured to first copy the data segment from a protocol engine to a socket buffer in a kernel space via direct memory access, and then copy the data segment copied to the socket buffer to the user buffer in the user space.

In some alternative implementations of the present embodiment, the row reading unit 504 of the device 500 for forwarding a data message is further configured to: read data of each row in the data message successively according to descending row numbers and storing the data in the user buffer in the user space; and determine data context of each row according to the read data length of each row.

In some alternative implementations of the present embodiment, the sending unit 505 of the device 500 for forwarding a data message further comprises: an accumulating sub-unit (not shown) configured to accumulate the read data length value until the preset data capacity threshold of the user buffer is reached; a sending sub-unit (not shown) configured to send the data, when the preset capacity threshold of the user buffer is reached, to the terminal device in units of rows and to reset the user buffer; and a reading sub-unit (not shown) configured to continue reading unread data from the data message and, after reading, to store the data in the reset user buffer.

Figure 6:
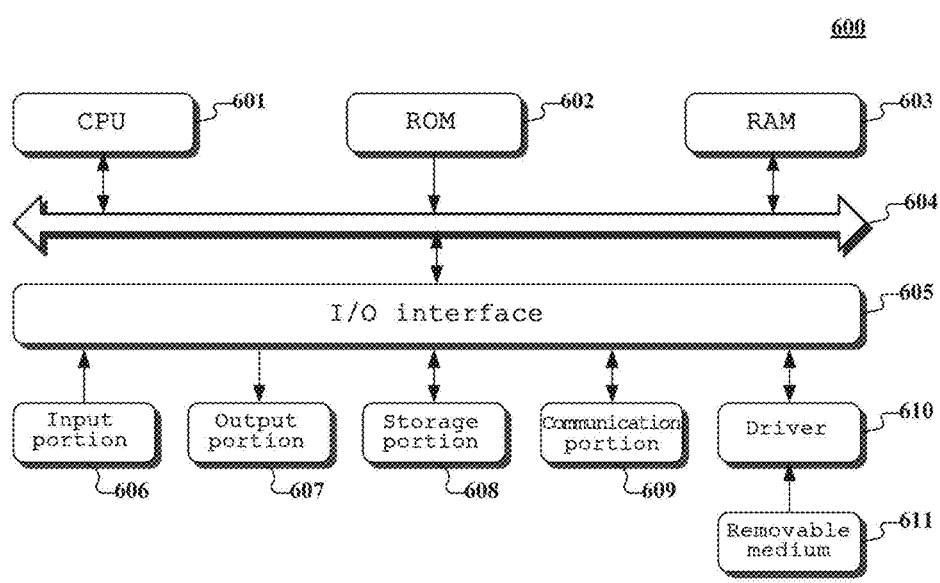
FIG. 6 illustrates a structural schematic diagram of a computer system adapted to implement a terminal device or a server of the embodiments of the present application.

Referring to FIG. 6, a schematic structural diagram of a computer system 600 adapted to implement a server of the embodiments of the present application is shown.

As shown in FIG. 6, the computer system. 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flowcharts may be implemented in a computer software program. For example, an embodiment of the present disclosure includes a computer program product, which comprises a computer program that is tangibly embedded in a machine-readable medium. The computer program comprises program codes for executing the method of the flowcharts. In such an embodiment, the computer program may be downloaded and installed from a network via the communication portion 609, and/or may be installed from the removable media 611.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a receiving unit, a determination unit, a segment reading unit, a row reading unit and a sending unit. For example, the receiving unit may also be described as "a unit for receiving a data massage.

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. When the one or more programs are executed by a device, the device is used for: receiving the data message and reading a data context length value of a first row in the data message; determining whether the data context length value is less than or equal to a maximum segment size in a single transmission according to a transmission control protocol; reading data from the data message in segments in response to the data context length value being less than or equal to the maximum segment size in the single transmission according to the transmission control protocol; reading data from the data message in rows in response to the data context length value being greater than the maximum segment size in the single transmission according to the transmission control protocol; and storing the read data in a user buffer, and sending the data in the user buffer to a terminal if the data in the user buffer exceeds a preset capacity threshold.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for forwarding a data message, comprising:
receiving the data message and reading a data context length value of a first row in the data message;
determining whether the data context length value is less than or equal to a maximum segment size in a single transmission according to a transmission control protocol;
reading data from the data message in segments in response to the data context length value being less than or equal to the maximum segment size in the single transmission according to the transmission control protocol;
reading data from the data message in rows in response to the data context length value being greater than the maximum segment size in the single transmission according to the transmission control protocol; and
storing the read data in a user buffer, and sending the data in the user buffer to a terminal if the data in the user buffer exceeds a preset capacity threshold,
wherein the storing the read data in a user buffer, and sending the data in the user buffer to a terminal if the data in the user buffer exceeds a preset capacity threshold comprises:
accumulating a data length value of the read data message until the preset capacity threshold of the user buffer is reached;
sending the data of each row read to the terminal when the preset capacity threshold is reached, and resetting the user buffer; and
continuing reading unread data in the data message and storing the read data in the reset user buffer.

2. The method according to claim 1, wherein the reading data from the data message in segments in response to the data context length value being less than or equal to the maximum segment size in the single transmission according to the transmission control protocol comprises:
packaging the data message into at least one data segment according to the maximum segment size;
copying each of the at least one data segment to a user space by data coping; and
unpackaging the at least one data segment after the at least one data segment is completely copied to the user space.

3. The method according to claim 2, wherein the unpackaging the at least one data segment after the at least one data segment is completely copied to the user space comprises:
determining successively a data length of each row in each data segment from the at least one data segment copied to the user space in chronological order according to copy time, the data length of each row being a sum of a fixed data length used to store the data context length value of each row and a data context length of each row; and
determining data context of each row according to the data length of each row.

4. The method according to claim 3, wherein the determining successively a data length of each row in each data segment from the at least one data segment copied to the user space in chronological order according to copy time comprises:
reading the fixed data length;
determining the data context length value of each row by reading the fixed data length; and
determining the data context length of each row according to the data context length value of each row.

5. The method according to claim 2, wherein the copying each of the at least one data segment to a user space by data coping comprises:
copying the data segment from a protocol engine to a socket buffer in a kernel space via direct memory access; and
copying the data segment copied to the socket buffer to the user buffer in the user space.

6. The method according to claim 1, wherein the reading data from the data message in rows in response to the data context length value being greater than the maximum segment size in a single transmission according to the transmission control protocol comprises:
reading data of each row in the data message successively according to descending row numbers and storing the data in the user buffer in the user space; and
determining data context of each row according to the read data length of each row.

7. A device for forwarding a data message, comprising:
at least one processor; and
a memory storing instructions, which when executed by the at least one processor, cause the at least one processor to perform operations, the operations comprising:
receiving the data message and reading a data context length value of a first row in the data message;
determining whether the data context length value is less than or equal to a maximum segment size in a single transmission according to a transmission control protocol;
reading data from the data message in segments in response to the data context length value being less than or equal to the maximum segment size in the single transmission according to the transmission control protocol;
reading data from the data message in rows in response to the data context length value being greater than the maximum segment size in the single transmission according to the transmission control protocol; and
storing the read data in a user buffer and sending the data in the user buffer to a terminal if the data in the user buffer exceeds a preset capacity threshold,
wherein the storing the read data in a user buffer, and sending the data in the user buffer to a terminal if the data in the user buffer exceeds a preset capacity threshold comprises:
accumulating a data length value of the read data message until the preset capacity threshold of the user buffer is reached;
sending the data of each row read to the terminal when the preset capacity threshold is reached, and resetting the user buffer; and
continuing reading unread data in the data message and storing the read data in the reset user buffer.

8. The device according to claim 7, wherein the reading data from the data message in segments in response to the data context length value being less than or equal to the maximum segment size in the single transmission according to the transmission control protocol comprises:
packaging the data message into at least one data segment according to the maximum segment size;
copying each of the at least one data segment to a user space by data coping; and
unpackaging the at least one data segment after the at least one data segment is completely copied to the user space.

9. The device according to claim 8, wherein the unpackaging the at least one data segment after the at least one data segment is completely copied to the user space comprises:
determining successively a data length of each row in each data segment from the at least one data segment copied to the user space in chronological order according to copy time, the data length of each row being a sum of a fixed data length used to store the data context length value of each row and a data context length of each row; and
determining data context of each row according to the data length of each row.

10. The device according to claim 9, wherein the determining successively a data length of each row in each data segment from the at least one data segment copied to the user space in chronological order according to copy time comprises:
reading the fixed data length;
reading the data context length value of each row by reading the fixed data length; and
determining the data context length of each row according to the data context length value of each row.

11. The device according to claim 10, wherein the copying each of the at least one data segment to a user space by data coping comprises:
copying the data segment from a protocol engine to a socket buffer in a kernel space via direct memory access; and
copying the data segment copied to the socket buffer to the user buffer in the user space.

12. The device according to claim 7, wherein the reading data from the data message in rows in response to the data context length value being greater than the maximum segment size in a single transmission according to the transmission control protocol comprises:
reading data of each row in the data message successively according to descending row numbers and storing the data in the user buffer in the user space; and
determining data context of each row according to the read data length of each row.

13. A non-transitory storage medium storing one or more programs, the one or more programs when executed by an apparatus, causing the apparatus to perform a method for forwarding a data message, comprising:
receiving the data message and reading a data context length value of a first row in the data message;
determining whether the data context length value is less than or equal to a maximum segment size in a single transmission according to a transmission control protocol;
reading data from the data message in segments in response to the data context length value being less than or equal to the maximum segment size in the single transmission according to the transmission control protocol;
reading data from the data message in rows in response to the data context length value being greater than the maximum segment size in the single transmission according to the transmission control protocol; and
storing the read data in a user buffer, and sending the data in the user buffer to a terminal if the data in the user buffer exceeds a preset capacity threshold,
wherein the storing the read data in a user buffer, and sending the data in the user buffer to a terminal if the data in the user buffer exceeds a preset capacity threshold comprises:
accumulating a data length value of the read data message until the preset capacity threshold of the user buffer is reached;
sending the data of each row read to the terminal when the preset capacity threshold is reached, and resetting the user buffer; and
continuing reading unread data in the data message and storing the read data in the reset user buffer.

* * * * *